United States Patent
Li et al.

(10) Patent No.: US 11,591,009 B2
(45) Date of Patent: Feb. 28, 2023

(54) POWER MANAGEMENT OF PERMANENT MAGNET SYNCHRONOUS MOTOR (PMSM) DRIVE USING MACHINE CURRENT LIMITING

(71) Applicant: STEERING SOLUTIONS IP HOLDING CORPORATION, Saginaw, MI (US)

(72) Inventors: Haibo Li, Saginaw, MI (US); Prerit Pramod, Saginaw, MI (US); Krishna M P K Namburi, Saginaw, MI (US); Zhe Zhang, Saginaw, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 564 days.

(21) Appl. No.: 16/693,516

(22) Filed: Nov. 25, 2019

(65) Prior Publication Data
US 2021/0155285 A1    May 27, 2021

(51) Int. Cl.
*B62D 5/04*    (2006.01)
*H02P 21/22*    (2016.01)
*H02P 6/08*    (2016.01)

(52) U.S. Cl.
CPC .............. *B62D 5/0463* (2013.01); *H02P 6/08* (2013.01); *H02P 21/22* (2016.02)

(58) Field of Classification Search
CPC .......... B62D 5/0463; H02P 21/22; H02P 6/08
USPC ............................................................ 701/41
See application file for complete search history.

(56) References Cited

U.S. PATENT DOCUMENTS

2008/0303475 A1 * 12/2008 Patel ..................... H02P 21/141
                                                                                318/634

FOREIGN PATENT DOCUMENTS

| CN | 107968609 A | * | 4/2018 | .............. H02P 21/22 |
| DE | 102012018819 A1 | * | 2/2014 | .......... H02P 21/0089 |
| JP | 2011244571 A | * | 12/2011 | |
| WO | WO-2018043502 A1 | * | 3/2018 | .............. H02P 21/00 |
| WO | WO-2021093397 A1 | * | 5/2021 | .......... H02P 21/0003 |

* cited by examiner

*Primary Examiner* — Jorge L Carrasquillo
(74) *Attorney, Agent, or Firm* — Dickinson Wright PLLC

(57) ABSTRACT

Technical solutions are described for controlling operation of an electric machine such as a permanent magnet synchronous motor (PMSM) drive or motor control system to protect against excessive machine current or voltage in a PMSM drive. Systems and methods employ a torque control algorithm for PMSMs that uses the constraints of both machine current and voltage capability in PMSM drives, and online torque command modification according to the maximum allowed torque under these machine current and voltage constraints.

12 Claims, 5 Drawing Sheets

POWER MANAGEMENT OF PERMANENT MAGNET SYNCHRONOUS MOTOR (PMSM) DRIVE USING MACHINE CURRENT LIMITING

BACKGROUND

The present application is generally related to methods and systems for controlling operation of an electric machine such as a permanent magnet synchronous motor (PMSM) drive or motor control system. More specifically, the present application is related to methods and systems for limiting machine current and voltage in a PMSM drive to protect against excessive machine current or voltage in a PMSM drive. Example embodiments are provided in electric power steering (EPS) systems.

Permanent Magnet Synchronous Machines (PMSMs) are gaining more and more attention in electric drive applications due to their properties such as high power density, easy controllability and improved reliability. The most widely adopted control technique for PMSMs is vector control, in which all AC signals are transformed into DC signals via a reference frame transformation. The control system is then implemented in the synchronously rotating or d/q reference frame utilizing current regulators.

SUMMARY

According to one or more embodiments, a system and method are provided that are configured to determine a torque command that is limited to within a maximum torque of the PMSM for a designated maximum DC link voltage and that does not exceed a designated maximum PMSM current limit value; and perform a maximum torque per ampere (MTPA) calculation using the torque command to determine current commands for PMSM control.

In accordance with an aspect of one or more example embodiments, the system and method are each further configured to determine if a PMSM voltage exceeds a designated maximum DC link voltage of the system; and use the current commands from the MTPA calculation for PMSM control when the PMSM voltage does not exceed the designated maximum DC link voltage.

In accordance with an aspect of one or more example embodiments, when the MTPV calculation determines that PMSM voltage exceeds the designated maximum DC link voltage, the system and method are each further configured to perform a MTPV calculation to determine current commands for PMSM control that achieve the maximum torque of the PMSM for the designated maximum DC link voltage, when the maximum torque of the PMSM is determined to be less than or equal to a given torque command, and current commands for PMSM control that achieve the given torque command, when the maximum torque of the PMSM is determined to be greater than the given torque command.

In accordance with an aspect of one or more example embodiments, when the maximum torque of the PMSM is determined to be greater than the given torque command during the MTPV calculation, the system and method are each further configured to reduce the PMSM voltage until the maximum torque of the PMSM is substantially equal to the given torque command for a designated motor speed and then determine current commands for PMSM control.

According to one or more embodiments, a system and method are provided that are configured to determine a torque command that is limited to within a maximum torque of a motor, perform a maximum torque per ampere (MTPA) calculation using the torque command to determine current commands for motor control; perform a maximum torque per voltage (MTPV) calculation that modifies the current commands as needed to satisfy a system voltage constraint; calculate a motor current value; use the current commands from the torque control module for motor control, when the calculated motor current value does not exceed a designated maximum motor phase current limit value; and when the calculated motor current value exceeds the designated maximum motor phase current limit value, determine updated current commands for motor control based on a selected current angle. The selected current angle is determined using a search operation for a motor current angle such that, if the calculated motor current exceeds the designated maximum motor phase current limit value, the magnitude of the calculated motor current is fixed at the designated maximum motor phase limit value and the selected current angle is swept from $\pi/2$ towards 0 until a modified torque increases and becomes equal to the torque commanded by the torque control module and the voltage is lower than or equal to a designated maximum DC link voltage of the motor.

In accordance with an aspect of one or more example embodiments, the system and method are each further configured to perform the search operation for the selected current angle by sweeping the current angle $\alpha$ to obtain $V_{dq}$ and $T_e$ wherein $$I_d = I_{m,max} \cos \alpha, \text{ and}$$

$$I_q = I_{m,max} \sin \alpha,$$

are used to determine $I_{dq}$ with $I_{m,max}$ being the designated maximum motor phase current limit, and $V_{dq}$ and $T_e$ are determined using $I_{dq}$ in the following equations $$V_d = RI_d + \omega_e L_q I_q,$$

$$V_q = RI_q + K_e \omega_m - \omega_e L_d I_d,$$

$$T_e = \tfrac{3}{2} K_e I_q + \tfrac{3}{4} N_p (L_q - L_d) I_d I_q,$$

where R is motor circuit resistance (Ohm), $L_d$ is d-axis inductance (Henry), $L_q$ is q-axis inductance (Henry), $K_e$ is motor voltage constant (Volt/rad/s), $\omega_m$ is mechanical motor velocity (rad/s), $\omega_e$ is electrical motor velocity (rad/s) and $N_p$ is number of motor magnetic poles.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
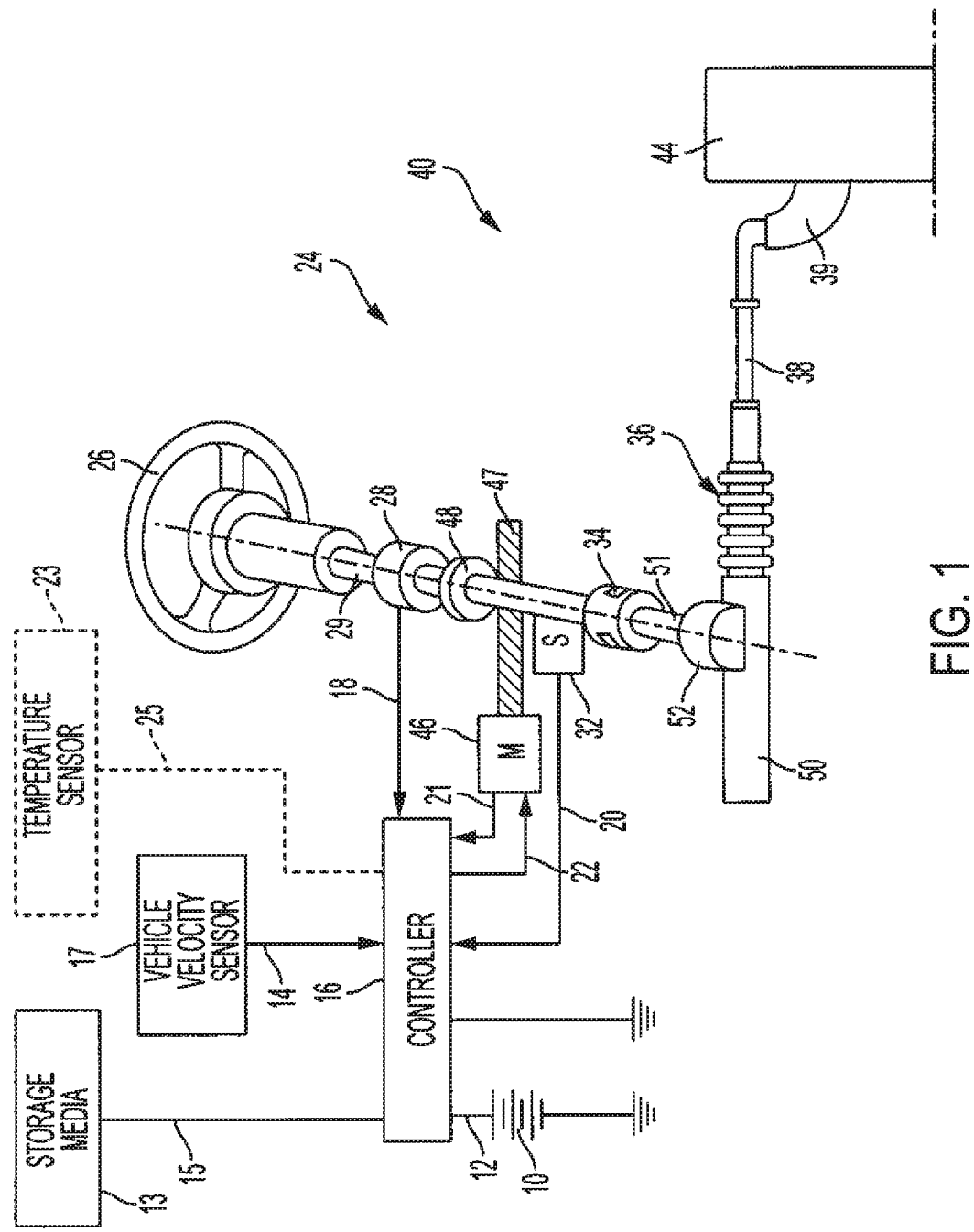
FIG. 1 depicts a block diagram of an example embodiment of an EPS system according to aspects of the present disclosure.

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

PMSM torque control is achieved through current control which usually adopts current and position measurements. Among various control strategies, Field Oriented Control (FOC) is the most commonly used technique for current control, in which all AC signals are transformed into DC signals via a reference frame transformation. The control system is then implemented in the synchronously rotating or d/q reference frame utilizing transformed current feedback.

In order to achieve optimal PMSM control performance regarding torque or efficiency, machine current and voltage must be controlled properly. Various algorithms have been developed for PMSM control to achieve better trajectory tracking accuracy and thereby improve system performance. None of these previous algorithms for PMSM optimal current trajectory control; however, the algorithms presented herein achieve optimal PMSM control with consideration of both machine and/or inverter current limits and voltage limits.

Example embodiments are provided herein that provide advantageous and new PMSM control schemes for optimal current trajectory control within constraints of both machine current and voltage capability in PMSM drives. In accordance with example embodiments described herein, machine current and voltage limits are translated to equivalent PMSM torque limits in the PMDM drive system, and implemented by online torque command modification according to the maximum allowable torque under machine current and voltage constraints. The torque control schemes of the example embodiments each restricts the machine current and voltage, and meanwhile also ensures optimal current trajectory for PMSM torque maximization. The improved torque control algorithm of the example embodiments therefore prevents the potential impact caused by excessive machine current or voltage in PMSM drive systems. The improved torque control algorithm of the example embodiments is applicable to all electric drive system employing PMSMs and is not restricted to any specific application.

Figure 2:
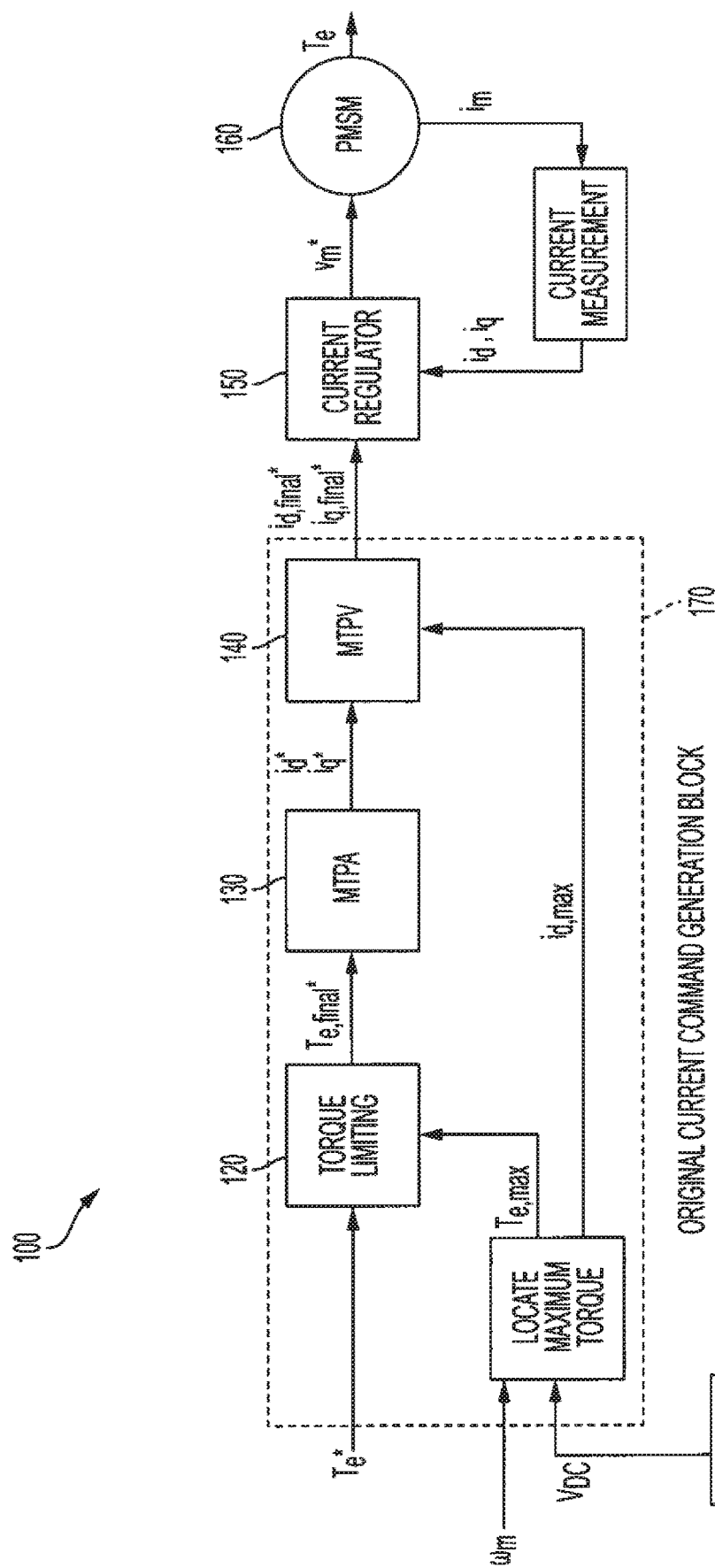
FIG. 2 depicts a block diagram of an example torque control algorithm for PMSMs according to aspects of the present disclosure.
Figure 6:
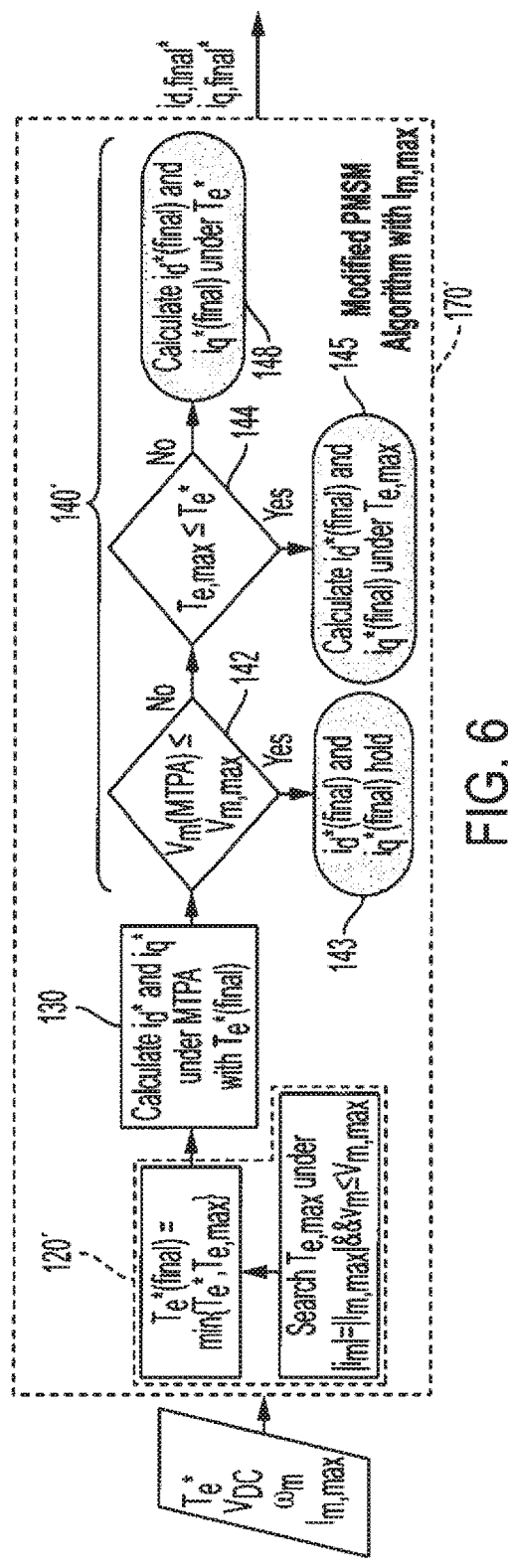
FIG. 6 depicts a block diagram of an example improved torque control algorithm for PMSMs according to aspects of the present disclosure.
Figure 7:
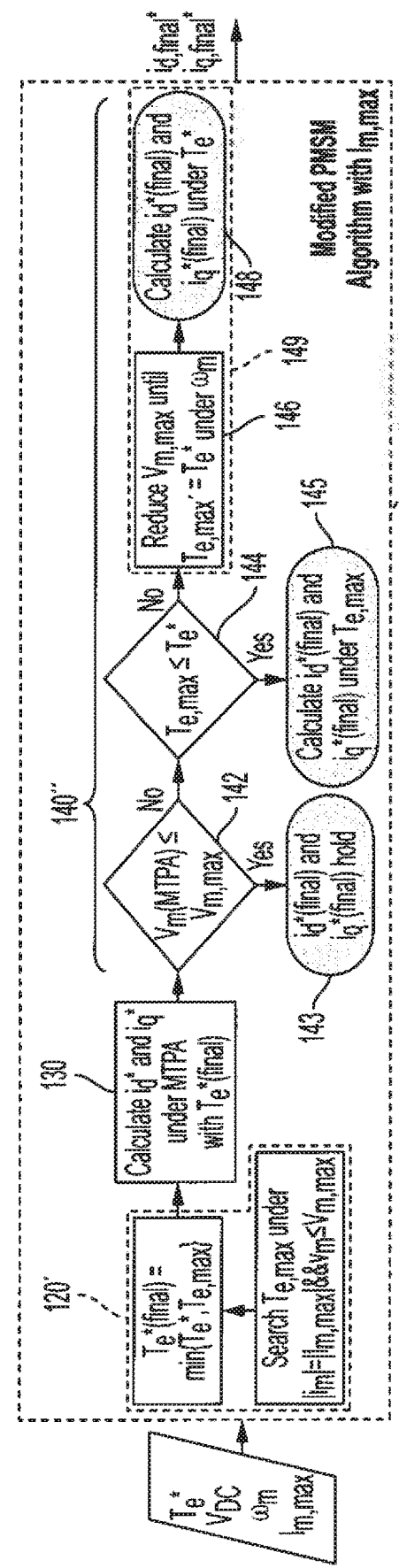
FIG. 7 depicts a block diagram of another example improved torque control algorithm for PMSMs according to aspects of the present disclosure.
Figure 8:
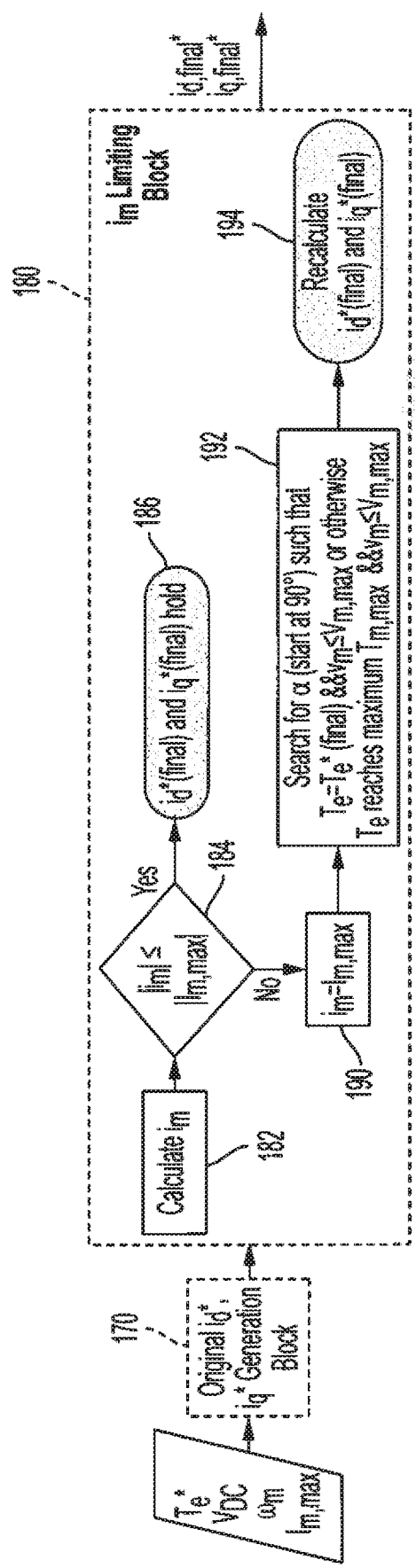
FIG. 8 depicts a block diagram of yet another example improved torque control algorithm for PMSMs according to aspects of the present disclosure.

An example EPS system and a torque control algorithm for a PMSM drive are described herein with reference to FIGS. 1 and 2, followed by a description of example embodiments of an improved torque control algorithm for a PMSM drive with reference to FIGS. 6, 7 and 8.

Referring now to the figures, where the technical solutions will be described with reference to specific embodiments, without limiting same, FIG. 1 is an exemplary embodiment of an electric power steering system (EPS) 40 suitable for implementation of the disclosed embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46, which could be a permanent magnet synchronous motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric power steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position Θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 is located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16.

The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency-based or time-based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

In one or more examples, the technical solutions described herein facilitate power management of the electric drive portion of the EPS system, i.e. the motor control system. It should be noted that, although the technical solutions are described herein using embodiments of an electric power steering system, the technical solutions are applicable to any other motor control system that is used in any other PMSM.

FIG. 2 depicts a block diagram of an example torque control algorithm 170 for PMSMs. The block diagram depicts a motor control system 100 in which for a given DC link voltage $V_{DC}$, which is derived from a battery 110, and a motor (mechanical) speed $\omega_m$, the maximum torque $T_{e,max}$ is calculated and then compared to a given torque command $T^*_e$ to generate a final torque command $T^*_{e,final}$ within the system capability by a torque limiting module 120. The $T^*_{e,final}$ is sent to a maximum torque per ampere (MTPA) module 130 to calculate current commands $i^*_d$ and $i^*_q$ which are sent into a maximum torque per voltage (MTPV) module 140 to check if the corresponding PMSM voltage $v_m$ exceeds the maximum feasible value $v^*_{d,final}$ limited by DC link voltage $V_{DC}$. If the PMSM voltage $v_m$ does not exceed $v_m = V_{m,max}$, current commands calculated by the MTPA module 130 are used as final commands $i^*_{d,final}$ and $i^*_{q,final}$ PMSM control; otherwise, different commands $i^*_{d,final}$ and $i^*_{q,final}$ generated by the MTPV block 140 to meet the PMSM voltage constraint. The motor control system 100 thus facilitates motor torque control and motor current control. The final current commands are then sent to a current regulator 150 for a PMSM 160. The current regulator ensures current tracking and therefore torque tracking. Here, 'tracking' refers to how close the output current (or torque) is to the desired current (or torque) as requested by the current command (torque command).

In accordance with example embodiments, an improved torque control algorithm for a PMSM drive is provided which actively performs machine current and voltage management. The development of this algorithm is facilitated by an analysis of various operation modes of the PMSM drive system depicted in FIG. 3. There are basically two operation regions in a PMSM drive system, i.e., MTPA and MTPV, which are denoted as region I and region III respectively in FIG. 3. The current commands in these two different regions are generated with MTPA and MTPV techniques or operations, respectively, to achieve optimal current command trajectory and hence optimal motor control. Essentially, the MTPA operation is to determine the dq current commands $i^*_d$ and $i^*_q$ such that the torque command $T^*_e$ is produced with the minimum machine current. The MTPV operation determines the current commands in the voltage saturated region, i.e., when the voltage command magnitude is equal to the DC link voltage, such that the current commands produce torque that is as close as possible to the requested torque command to ensure optimal current trajectory. Both MTPA and MTPV techniques or operations utilize estimates of the machine and inverter parameters, which involves the machine model considering nonlinearities, to determine the current commands online.

Figure 3:
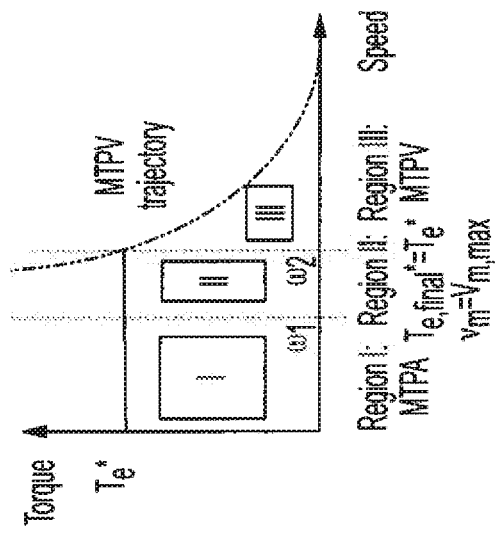
FIG. 3 depicts operation regions in a PMSM drive.

Besides Region I and III, there is also a transition region in between, denoted as region II in FIG. 3, where $T^*_{e,final}=T^*_e$ and $v_m=V_{m,max}$. Flux-weakening is performed in this region to keep the machine voltage within $V_{m,max}$ while the final torque command is kept the same as original.

Machine current and voltage management is critical in a PMSM drive and must be considered in the control system to ensure that the machine operates at the optimal operating condition. The voltage of a given PMSM system must first be guaranteed under the voltage capability to avoid control algorithm failure. In addition, machine current must be maintained under certain maximum limit because it influences the power loss and heat dissipation inside of machine and is directly related with the inverter design which must be able to carry the maximum machine current. If the machine current is higher than the device power rating, inverter might fail. Therefore, machine current must be carefully managed within the device current rating to avoid inverter failure and hence improve system reliability. Furthermore, a well-controlled machine current can reduce the requirement of device rating in the inverter design process which facilitates hardware circuit design with reduced cost components.

Previous techniques primarily consider the optimal current trajectory control so that the torque or efficiency can be maximized. However, the maximum machine current is not considered. In order to prevent potential problems caused by high machine current, a PMSM control scheme with both maximum machine current limiting and optimal current trajectory control is desired to enhance system design, and meanwhile ensure maximum torque or efficiency in PMSM drives.

The PMSM control scheme described herein in accordance with example embodiments secures the machine current and voltage limiting target, has the capability to ensure maximum torque or efficiency, is easy to implement online, and has good accuracy throughout the entire operation regions of the machine. To actively limit the machine current, the PMSM operation trajectory analysis must be performed, which is shown in FIG. 3.

There are basically two operation regions in a PMSM drive system, i.e. MTPA and MTPV which are denoted as region I and region III respectively in FIG. 2(a). The current commands in these two different regions are generated with MTPA and MTPV techniques respectively, to achieve optimal current trajectory and hence optimal motor control. Essentially, the MTPA technique is to determine the dq current commands $i^*_d$ and $i^*_q$ such that the torque command $T^*_e$ is produced with the minimum machine current. The MTPV technique determines the current commands in the voltage saturated region, i.e., when the voltage command magnitude is equal to the DC link voltage or the machine is impedance limited, such that the current commands produce torque that is as close as possible to the requested torque command. Both techniques utilize parameter estimation results along with the machine model considering nonlinearities to determine the current commands online. Besides Region I and III, there is also a transition region in between, denoted as region II in FIG. 2(a), where $T^*_{e,final}=T^*_e$ and $v_m=V_{m,max}$. Flux-weakening is performed in this region to keep the machine voltage within $V_{m,max}$ while the final torque command is kept the same as original.

Figure 5:
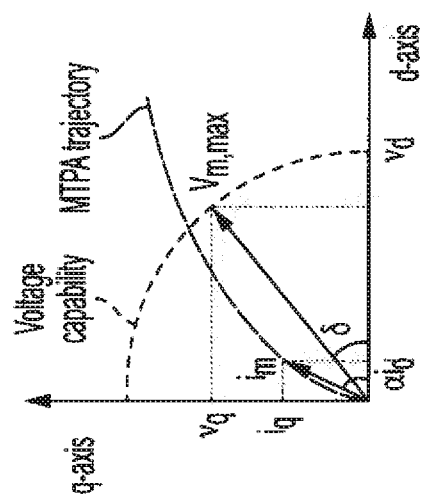
FIG. 5 depicts voltage trajectories under MTPA operation of PMSM drive.
Figure 4:
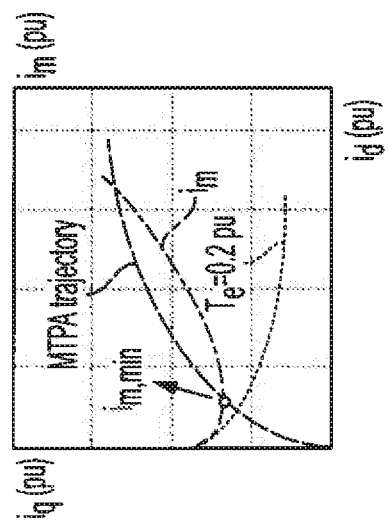
FIG. 4 depicts current command trajectories under MTPA operation of PMSM drive.

The PMSM MTPA trajectory is shown in FIG. 4. As can be seen in the figure, for a given torque command, e.g., $T_e=0.2$ pu, there are numerous dq current $i_d$ and $i_q$ combinations meeting the torque requirement. However, there is one point where the final machine current $i_m$ is the minimum, i.e., MTPA operation point under this torque command. Connecting all MTPA operation points under various torque commands results in a continuous MTPA trajectory. The MTPA operation is highly desired in a PMSM drive system because the torque command is tracked, and meanwhile the minimum machine current is maintained which minimizes the machine losses. However, with the extension of MTPA trajectory, the MTPA operation finally becomes not feasible due to the fact that the voltage capability, which is determined by DC link voltage $V_{m,max}$, will be reached at certain point, as shown in FIG. 5. The increase of either a given torque command $T^*_e$ or motor speed $\omega_m$ will contribute to a higher PMSM voltage and accelerate approaching the voltage capability curve. After the MTPA operation region and before performing a MTPV operation, there might be a region where flux-weakening is performed, and the given torque requirement can still be met. Once a PMSM enters its MTPV operation region, the torque command cannot be tracked any more. Instead, a maximum possible torque $T_{m,max}$ within PMSM voltage capability will be used to ensure optimal current trajectory. The waveforms in a salient PMSM drive are given in FIG. 3 to illustrate the different operation regions.

If a machine current limit $I_{m,max}$ is to be considered as PMSM control constraint in the existing torque control algorithm 170, the torque command must be modified accordingly. The challenge is presented because the maximum allowable torque to prevent machine current exceeding its limit is unknown and can hardly be solved analytically due to the complexity of MTPA and MTPV techniques to maintain optimal current trajectory. Example embodiments provide a technical solution to this problem. To solve this problem, a maximum torque searching-based method considering maximum machine current is implemented via an improved torque control algorithm (e.g., see example algorithms 170', 170" and 180 described with reference to FIGS. 6, 7 and 8, respectively) obviates the analytical complexity of maximum torque calculation under a given machine current limit. The improved torque control algorithm of the illustrative embodiments can be performed, for example, by a processing device such as the controller 16.

The flow chart of a PMSM control scheme comprising an improved torque control algorithm 170' that considers current and voltage capability is shown in FIG. 6. The improved torque control algorithm 170' considering current and voltage capability is achieved by modifying the current commands calculation process of the existing torque control algorithm 170. Specifically, an additional constraint of machine current limiting is added into the torque-searching operation 120' to find the maximum torque within the system capability which at the same time ensures the machine current within the limited value $I_{m,max}$. The maximum torque then is sent to the MTPA operation 130 and MTPV operation 140' to calculate the current commands $i^*_{d,final}$ and $i^*_{q,final}$ for optimal current trajectory tracking.

With continued reference to FIG. 6, the improved torque control algorithm 170' performs a torque limit operation 120' to determine a torque command $T^*_{e,final}$ that is limited to within a maximum torque $T_{e,max}$ of the PMSM for a designated maximum DC link voltage $V_{m,max}$ and that does not exceed a designated PMSM current value $I_{m,max}$. The improved torque control algorithm 170' also performs a MTPA operation (130) using the torque command $T^*_{e,final}$ to determine current commands $i^*_d$ and $i^*_q$ for PMSM control.

Mathematical equations for calculating $T_{e,max}$ are:

$$V_d = RI_d + \omega_e L_q I_q \quad (1)$$

$$V_q = RI_q + K_e \omega_m - \omega_e L_d I_d \quad (2)$$

$$T_e = \tfrac{3}{2} K_e I_q + \tfrac{3}{4} N_p (L_q - L_d) I_d I_q \quad (3)$$

$$V_d^2 + V_q^2 = V_{DC}^2/3 \quad (4)$$

$$I_d^2 + I_q^2 = I_m^2 \quad (5)$$

Equations (1) and (2) are motor voltage equations. Equation (3) is the torque equation. Equation (4) is the voltage constraint. Equation (5) is the motor phase current constraint. The objective of the optimization realized by the example embodiment of FIG. 6 is to maximize the torque in Eq. (3) while satisfying the voltage and motor current constraints. Note that in these equations R is motor resistance (Ohm), $L_d$ is d-axis inductance (Henry), $L_q$ is q-axis inductance (Henry), $K_e$ is a motor voltage constant (V/rad/s), $\omega_m$ is a mechanical motor velocity (rad/s), $\omega_e$ is an electrical speed of the motor (rad/s) and $N_p$ is the number of poles of the motor 160.

With further reference to FIG. 6, the improved torque control algorithm 170' performs a MTPV operation (140') that determines if a PMSM voltage exceeds a designated maximum DC link voltage of the system (block 142), and uses the current commands $i^*_d$ and $i^*_q$ from the MTPA calculation for PMSM control when the PMSM voltage $v_m$ does not exceed the designated maximum DC link voltage $V_{m,max}$ (block 143). When the MTPV calculation 140' determines that PMSM voltage $v_m$ exceeds the designated maximum DC link voltage $V_{m,max}$ (block 142), the improved torque control algorithm 170' is further configured determine if the maximum torque $T_{e,max}$ of the PMSM is less than or equal to a given torque command $T^*_e$ (block 144). The MTPV calculation 140' determines current commands for PMSM control that achieve the maximum torque $T_{e,max}$ of the PMSM for the designated maximum DC link voltage when the maximum torque $T_{e,max}$ of the PMSM is determined to be less than or equal to a given torque command (block 145). The MTPV calculation 140' determines current commands for PMSM control that achieve the given torque command $T^*_e$, when the maximum torque $T_{e,max}$ of the PMSM exceeds the given torque command $T^*_e$ (block 148).

The improved torque control algorithm 170' in FIG. 6 is capable of achieving optimal torque control in PMSM drives. However, the voltage utilization may not be optimal in some operation points, which are located in region II of PMSM operation as illustrated in FIG. 3, that is when maximum torque under $V_{m,max}$ is higher than $T^*_e$ with flux-weakening. The non-optimal operation of the PMSM drive is due to the fact that the machine voltage is not optimally used. Therefore, optimization can be performed to achieve better machine voltage utilization, as shown in improved torque control algorithm 170" in FIG. 7. The operations of the improved torque control algorithm 170" for better voltage utilization are similar to those described with respect to the improved torque control algorithm 170' in FIG. 6, except for the addition of another step (block 146) in operations (block 149) performed after the modified MTPV operation 140" determines that maximum torque $T_{e,max}$ of the PMSM exceeds the given torque command $T^*_e$ (block 144).

In practice, the reduction of machine voltage $V_{m,max}$ can be controlled by manually adding a voltage limit into the algorithm 170" (block 146) after the MTPV operation 140" determines that the maximum torque $T_{e,max}$ of the PMSM exceeds the given torque command $T^*_e$ (block 144). The voltage limit can be a designated parameter value in the program code that implements the algorithm 170" or can be empirically determined or iteratively determined. The algorithm 170" reduces the PMSM voltage $V_{m,max}$ until the maximum torque $T_{e,max}$ of the PMSM is substantially equal to the given torque command $T^*_e$ for a designated motor speed. By reducing $V_{m,max}$ per block 146 and making better utilization of $V_{m,max}$ such that the maximum torque under $V_{m,max}$ is equal to $T^*_e$ with flux-weakening, the machine current can be maintained at minimum which is beneficial in the PMSM drives as discussed above.

Since the machine 160 and inverter 150 can be designed to carry the machine current under most operation conditions (i.e., or all operation conditions without machine and inverter design optimization by machine current limiting), except a narrow transition region after MTPA region under large torque command, the machine current without any limiting most of the time will not cause damage to the machine 160 and inverter 150 in a PMSM drive system. As such, in accordance with another example embodiment, an improved torque control algorithm 180 is provided that employs post-command generation modification of current commands as illustrated in FIG. 8.

As shown in FIG. 8, the improved torque control algorithm 180 employs a current command generation module similar to the existing torque control algorithm 170 described with reference to FIG. 2. The improved torque control algorithm 180 achieves machine current limiting by first calculating machine current $i_m$ (block 182) at the output of the existing torque control algorithm 170. If the machine current $i_m$ does not exceed a $I_{m,max}$ (block 184), the improved torque control algorithm 180 uses the current commands from the torque control algorithm 170 for motor control (block 186). If the machine current $i_m$ exceeds a $I_{m,max}$ (block 184), the improved torque control algorithm 180 determines updated current commands for motor control based on a selected current angle as indicated at blocks 190, 192 and 194 in FIG. 8. If the machine current $i_m$ exceeds the limit $I_{m,max}$, the magnitude of the current is fixed at the limit value (block 190) and the angle α is swept from $$\frac{\pi}{2}$$

towards 0 gradually (block 192) until the modified torque increases and becomes equal to the commanded torque and the voltage is lower than or equal to the maximum voltage $V_{m,max}$. This search is performed because, if the current is simply limited to the maximum limit $I_{m,max}$ while the angle α is unchanged, it may result in a drastically lower modified torque even though the voltage constraint would still be met. Thus, the angle is changed from a value of $$\frac{\pi}{2}$$

where only d-axis current is non-zero while q-axis current is zero (i.e., torque is zero) towards zero since the maximum torque output lies at an angle between those two extremes.

The search operation (block 192) for the selected current angle comprises sweeping the current angle α to obtain $V_{dq}$ and $T_e$ wherein $$I_d = I_{m,max} \cos α, \text{ and}$$

$$I_q = I_{m,max} \sin α,$$

are used to determine $I_{dq}$ with $I_{m,max}$ being the designated maximum motor phase current limit, and $V_{dq}$ and $T_e$ a determined using $I_{dq}$ in the following equations
$V_{dq}$ and $T_e$ are determined using $I_{dq}$ in the following equations $$V_d = RI_d + ω_e L_q I_q,$$

$$V_q = RI_q + K_e ω_m - ω_e L_d I_d,$$

where R is motor circuit resistance (Ohm), $L_d$ is d-axis inductance (Henry), $L_q$ is q-axis inductance (Henry), $K_e$ is motor voltage constant (Volt/rad/s), $ω_m$ is mechanical motor velocity (md/s), $ω_e$ is electrical motor velocity (rad/s) and $N_p$ is number of motor magnetic poles.

In the improved torque control algorithm 180, which provides a $i_m$ limiting module 180 after an existing torque control algorithm 170, original current commands $i^*_{d,final}$ and $i^*_{q,final}$ from the existing torque control algorithm 170 will pass directly to current regulator 150 most of the time if PMSM current limit is not exceeded. For the case of large torque command in the specific region when original $i_m$ is higher than $I_{m,max}$, further calculation is performed to generate new $i^*_{d,final}$ and $i^*_{q,final}$ (e.g., blocks 190, 192 and 194) such that PMSM current and voltage limits are not exceeded. This approach 180 is essentially the same as the technical solution 170 shown in FIG. 6 but can potentially save computational resources.

Each one of the example technical solutions given in the example embodiments of FIGS. 6, 7 and 8 can give expected results regarding optimal current trajectory tracking considering the machine current and voltage capability. For the case when original $i_m$ is higher than $I_{m,max}$, the example technical solutions given in the example embodiments of FIGS. 6, 7 and 8 can generate new $i^*_{d,final}$ and $i^*_{q,final}$ such that PMSM current and voltage limits are not exceeded.

Machine current limiting is essential in electric drives to aid in protection of the motor, inverter and other parts of the electric drive system. Although existing techniques are available for motor current management, these existing techniques are characterized by disadvantages. For example, offline calibration can be performed; however, the calibrated current limit is often too conservative. Also, offline calibration has to be performed for different motors, which is time-consuming. Further, due to the offline nature of these techniques, the current and torque commands are not optimal since dynamically changing operation conditions of the PMSM 160 are not considered. On the other hand, while dynamic techniques that iteratively modify the motor torque command are more accurate, they are computationally complex for implementation.

The technical solutions for motor current management provided by the example embodiments of FIGS. 6, 7 and 8 are advantageous over the afore-mentioned current limiting techniques for a number of reasons. For example, the example embodiments are computationally efficient solutions in that an additional motor current constraint appended to the original reference model (e.g., the torque control algorithm 170 of FIG. 2 and PMSM operation regions or modes and trajectory analyses in FIGS. 3-5). In addition, the multiple example embodiments of FIGS. 6-8 provide convenient tradeoff between accuracy and complexity. The example embodiments of FIGS. 6-8 consider dynamic variation of operating conditions through online limiting capability, are able to dynamically limit the maximum motor current, are applicable for all permanent magnet synchronous machines under all conditions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A system comprising:
a permanent magnet synchronous machine (PMSM); and
a motor control system configured to limit machine current, the motor control system being configured to:
determine a torque command that is limited to within a maximum torque of the PMSM for a designated maximum DC link voltage and that does not exceed a designated maximum PMSM current limit value;
perform a maximum torque per ampere (MTPA) calculation using the torque command to determine current commands for PMSM control;
calculate a motor current value;
use the current commands when the calculated motor current value does not exceed a designated maximum motor phase current limit value;
when the calculated motor current value exceeds a designated maximum motor phase current limit value, determine current commands for motor control based on a selected current angle:
wherein the selected current angle is determined using a search operation for a motor current angle such that, when the calculated motor current exceeds the designated maximum motor phase current limit value, the magnitude of the calculated motor current is fixed at the designated maximum motor phase limit value and the selected current angel is swept from $$\frac{\pi}{2}$$

towards 0 until a modified torque increases and becomes equal to the torque commanded by the torque control module and the voltage is lower than or equal to a designated maximum DC link voltage of the motor.

2. The system of claim 1, wherein the motor control system is further configured to:
determine when a PMSM voltage exceeds a designated maximum DC link voltage of the system; and
use the current commands from the MTPA calculation for PMSM control when the PMSM voltage does not exceed the designated maximum DC link voltage.

3. The system of claim 2, wherein, when the MTPV calculation determines that PMSM voltage exceeds the designated maximum DC link voltage, the motor control system is further configured to perform a MTPV calculation to determine:
current commands for PMSM control that achieve the maximum torque of the PMSM for the designated maximum DC link voltage, when the maximum torque of the PMSM is determined to be less than or equal to a given torque command; and
current commands for PMSM control that achieve the given torque command, when the maximum torque of the PMSM is determined to be greater than the given torque command.

4. The system of claim 3, wherein, when the maximum torque of the PMSM is determined to be greater than the given torque command during the MTPV calculation, the motor control system is further configured to reduce the PMSM voltage until the maximum torque of the PMSM is substantially equal to the given torque command for a designated motor speed and then determine current commands for PMSM control.

5. A motor control system configured to limit supply current and regenerative current, the motor control system comprising:
a torque control module configured to:
determine a torque command that is limited to within a maximum torque of a motor;
perform a maximum torque per ampere (MTPA) calculation using the torque command to determine current commands for motor control; and
perform a maximum torque per voltage (MTPV) calculation that modifies the current commands as needed to satisfy a system voltage constraint; and
a motor current limiting module configured to:
calculate a motor current value;
use the current commands from the torque control module for motor control, when the calculated motor current value does not exceed a designated maximum motor phase current limit value; and
when the calculated motor current value exceeds the designated maximum motor phase current limit value, determine updated current commands for motor control based on a selected current angle;
wherein the selected current angle is determined using a search operation for a motor current angle such that, when the calculated motor current exceeds the designated maximum motor phase current limit value, the magnitude of the calculated motor current is fixed at the designated maximum motor phase limit value and the selected current angle is swept from $$\frac{\pi}{2}$$

towards 0 until a modified torque increases and becomes equal to the torque commanded by the torque control module and the voltage is lower than or equal to a designated maximum DC link voltage of the motor.

6. The motor control system of claim 5, wherein the search operation for the selected current angle comprises sweeping the current angle α obtain $V_{dq}$ and $T_e$ wherein $$I_d = I_{m,max} \cos \alpha, \text{ and}$$

$$I_q = I_{m,max} \sin \alpha,$$

are used to determine $I_{dq}$ with $I_{m,max}$ being the designated maximum motor phase current limit, and
$V_{dq}$ and $T_e$ are determined using $I_{dq}$ in the following equations $$V_d = RI_d + \omega_e L_q I_q,$$

$$V_q = RI_q + K_e \omega_m - \omega_e L_d I_d,$$

$$T_e = \frac{3}{2} K_e I_q + \frac{3}{4} N_p (L_q - L_d) I_d I_q,$$

where R is motor circuit resistance (Ohm), $L_d$ is d-axis inductance (Henry), $L_q$ is q-axis inductance (Henry), $K_e$ is motor voltage constant (Volt/rad/s), $\omega_m$ is mechanical motor velocity (rad/s), $\omega_e$ is electrical motor velocity (rad/s) and $N_p$ is number of motor magnetic poles.

7. A method for limiting machine current and voltage in motor control system, comprising:
  determine a torque command that is limited to within a maximum torque of the PMSM for a designated maximum DC link voltage and that does not exceed a designated maximum PMSM current limit value; and
  perform a maximum torque per ampere (MTPA) calculation using the torque command to determine current commands for PMSM control;
  calculate a motor current value;
  use the current commands when the calculated motor current value does not exceed a designated maximum motor phase current limit value;
  when the calculated motor current value exceeds a designated maximum motor phase current limit value, determine current commands for motor control based on a selected current angle;
  wherein the selected current angle is determined using a search operation for a motor current angle such that, when the calculated motor current exceeds the designated maximum motor phase current limit value, the magnitude of the calculated motor current is fixed at the designated maximum motor phase limit value and the selected current angle is swept from $\pi/2$ towards 0 until a modified torque increases and becomes equal to the torque commanded by the torque control module and the voltage is lower than or equal to a designated maximum DC link voltage of the motor.

8. The system of claim 7, wherein the motor control system is further configured to:
  determine when a PMSM voltage exceeds a designated maximum DC link voltage of the system; and
  use the current commands from the MTPA calculation for PMSM control when the PMSM voltage does not exceed the designated maximum DC link voltage.

9. The system of claim 7, wherein, when the MTPV calculation determines that PMSM voltage exceeds the designated maximum DC link voltage, the motor control system is further configured to perform a MTPV calculation to determine:
  current commands for PMSM control that achieve the maximum torque of the PMSM for the designated maximum DC link voltage, when the maximum torque of the PMSM is determined to be less than or equal to a given torque command; and
  current commands for PMSM control that achieve the given torque command, when the maximum torque of the PMSM is determined to be greater than the given torque command.

10. The system of claim 8, wherein, when the maximum torque of the PMSM is determined to be greater than the given torque command during the MTPV calculation, the motor control system is further configured to reduce the PMSM voltage until the maximum torque of the PMSM is substantially equal to the given torque command for a designated motor speed and then determine current commands for PMSM control.

11. A method for limiting supply current and regenerative current, the motor control system comprising:
  determining a torque command that is limited to within a maximum torque of a motor;
  performing a maximum torque per ampere (MTPA) calculation using the torque command to determine current commands for motor control;
  performing a maximum torque per voltage (MTPV) calculation that modifies the current commands as needed to satisfy a system voltage constraint;
  calculating a motor current value;
  using the current commands for motor control when the calculated motor current value does not exceed a designated maximum motor phase current limit value; and
  when the calculated motor current value exceeds the designated maximum motor phase current limit value, determining updated current commands for motor control based on a selected current angle;
  wherein the selected current angle is determined using a search operation for a motor current angle such that, when the calculated motor current exceeds the designated maximum motor phase current limit value, the magnitude of the calculated motor current is fixed at the designated maximum motor phase limit value and the selected current angle is swept from $\pi/2$ towards 0 until a modified torque increases and becomes equal to the torque commanded by the torque control module and the voltage is lower than or equal to a designated maximum DC link voltage of the motor.

12. The motor control system of claim 11, wherein the search operation for the selected current angle comprises sweeping the current angle $\alpha$ obtain $V_{dq}$ and $T_e$ wherein $$I_d = I_{m,max} \cos \alpha, \text{ and}$$

$$I_q = I_{m,max} \sin \alpha,$$

are used to determine $I_{dq}$ with $I_{m,max}$ being the designated maximum motor phase current limit, and
$V_{dq}$ and $T_e$ are determined using $I_{dq}$ in the following equations $$V_d = RI_d + \omega_e L_q I_q,$$

$$V_q = RI_q + K_e \omega_m - \omega_e L_d I_d,$$

$$T_e = \tfrac{3}{2} K_e I_q + \tfrac{3}{4} N_p (L_q - L_d) I_d I_q,$$

where R is motor circuit resistance (Ohm), $L_d$ is d-axis inductance (Henry), $L_q$ is q-axis inductance (Henry), $K_e$ is motor voltage constant (Volt/rad/s), $\omega_m$ is mechanical motor velocity (rad/s), $\omega_e$ is electrical motor velocity (rad/s) and $N_p$ is number of motor magnetic poles.

* * * * *